United States Patent [19]

Saka et al.

[11] Patent Number: 4,703,512

[45] Date of Patent: Oct. 27, 1987

[54] PATTERN OUTLINE TRACKING METHOD AND APPARATUS

[75] Inventors: Kazuhiko Saka, Joyo; Atsushi Hisano, Nagaokakyo; Michitaka Kato, Kyoto; Toshimichi Masaki, Takatsuki; Nobuo Nakatsuka, Kyoto, all of Japan

[73] Assignee: Omron Tateisi Electronics Co., Kyoto, Japan

[21] Appl. No.: 760,607

[22] Filed: Jul. 30, 1985

[30] Foreign Application Priority Data

Jul. 31, 1984 [JP] Japan ................. 59-162264

[51] Int. Cl.⁴ .................... G06K 9/30; G06K 9/46
[52] U.S. Cl. .................................. 382/22; 382/25; 382/27; 382/60
[58] Field of Search ............. 382/60, 22, 27, 50, 382/25, 8, 9

[56] References Cited

U.S. PATENT DOCUMENTS

| | | | |
|---|---|---|---|
| 3,643,215 | 2/1972 | Ingham | 382/37 |
| 3,737,854 | 6/1973 | Klemt | 382/50 |
| 4,091,394 | 5/1978 | Kashioka et al. | 382/22 |
| 4,115,761 | 9/1978 | Ueda | 382/37 |
| 4,295,121 | 10/1981 | Enser | 382/9 |
| 4,435,835 | 3/1984 | Sakow | 382/48 |
| 4,468,704 | 8/1984 | Stoffel | 358/282 |
| 4,504,971 | 3/1985 | Nadler | 382/9 |
| 4,510,616 | 4/1985 | Lougheed | 382/25 |
| 4,520,505 | 5/1985 | Yamamoto | 382/54 |
| 4,555,798 | 11/1985 | Broadbent | 382/27 |
| 4,561,106 | 12/1985 | Yoshida | 382/25 |
| 4,566,128 | 1/1986 | Araki | 382/60 |
| 4,593,325 | 6/1986 | Kannapell | 382/50 |
| 4,624,013 | 11/1986 | Urushibata | 382/9 |
| 4,628,532 | 12/1986 | Stone | 382/25 |

OTHER PUBLICATIONS

"Digital Contour Following", IBM Technical Disclosure Bulletin, vol. 17, No. 12, May 1975, J. L. Crawford & G. W. Volkman, pp. 3691-3692.

Primary Examiner—Leo H. Boudreau
Assistant Examiner—A. Anne Skinner
Attorney, Agent, or Firm—Stevens, Davis, Miller & Mosher

[57] ABSTRACT

A pattern outline tracking system provides the functions that include scanning an object to be recognized and providing a series of analog video signals, comparing a video signal level with the specific, variable threshold level and providing a binary signal consisting of a sequence of serial bits, holding the binary signal bits as the input image pattern in an image memory, deriving partial patterns sequentially from the serial binary signal bits, each of the partial patterns consisting of a matrix of vertical and horizontal lines each containing specific numbers of pixels, matching the partial patterns against the corresponding reference patterns containing the previously defined starting points to be tracked, holding the address in the image memory for the certain pixel within the partial pattern identified in the matching step as the possible point address for the tracking operation, and tracking the outline of the input image pattern on the image memory in accordance with the possible point address.

6 Claims, 8 Drawing Figures

PATTERN OUTLINE TRACKING METHOD AND APPARATUS

BACKGROUND OF THE INVENTION

The present invention relates generally to a pattern recognition system that handles image imputs from a TV camera, such as characters and figures, and specifically it pertains to the art that allows unidentified characters or graphical figures to be recognized by first converting the image input into a binary signal form composed of black and white intensity levels to obtain its input image pattern, and then matching the thus obtained image pattern against a reference pattern previously defined and stored in memory, e. g. in the form of a dictionary file. More specifically, the present invention relates to a method of and an apparatus for tracking the outline of a pattern whereby the outer contours or boundaries of an object can be traced by a high-rate scanning prior to the required pattern matching operation.

Usually, this type of pattern outline tracking, whose principle of operation is illustrated in FIG. 1, takes place by first scanning through the image or picture memory in which a given input pattern is stored in the direction of the scan lines as indicated by an arrow a, finding out any point S1 that satisfies the specific conditions in order to be used as the starting point of the outer contour of the image, and then beginning to trace the outer contour of the input pattern with the thus found starting point S1 (as shown by an arrow b in the same figure). Following the above first scanning, another scanning is then repeated to find the starting point S2 next to be traced. If found, the tracking begins with the new starting point. Then, the same procedure is repeated successively until all possible starting points to be traced are found, and is completed when no more starting points can be found.

As it may readily be understood from the above description, when the above tracking system is used and if an input pattern contains a large number of outlines, it would be necessary to find the starting points to be traced for all the outlines, and accordingly to scan through the image memory from the top address to the bottom address repeatedly each time an attempt is made to find those starting points. During the outline tracking process, therefore, the time required for finding the starting points would be considerably increased, which causes a reduction in the performance in the outline tracking, or even the total processing efficiency in the pattern recognition.

SUMMARY OF THE INVENTION

It is therefore a principal object of the present invention to provide a method and an apparatus by and in which all possible starting points for an outline of an input image pattern to be tracked can be found with a high speed, whereby the time required for the outline tracking processing can be shortened, thus further improving the total performance or processing efficiency for the pattern recognition system.

The present invention accomplishes the above object by first converting an input analog video signal for an object such as characters and figures into the corresponding digital (binary) signal form which is composed of white and black intensity levels to obtain an input pattern, extracting partial patterns successively, each of which contains a matrix of a specific number of vertical and horizontal pixels or pels (picture elements) from the thus obtained video signal that contains a sequence of serial binary bits, matching those partial patterns against the reference patterns including the starting points previously defined and stored in the memory, and storing the address for the appropriate pixel within the partial pattern as an addressable (possible) starting point when matching occurs. Upon reading that possible starting point address from the memory, the outer contour defining the input image pattern can thus be traced by starting with the possible starting point address.

By following the above-described steps according to the present invention, all addressable starting points for an image outline can be found with the high speed that corresponds to the video signal rate, at the same time the image data is input and fed to the image memory. When the present invention is used, therefore, it is not necessary to scan through the image memory repeatedly as many times as required to find the starting points as in the case of the usual scanning practice. As its specific feature, the present invention allows the outline tracking to be started with the addressable starting point already found, thus reducing the time required for the tracking processing with the result that the total pattern recognition processing performance can be enhanced.

BRIEF DESCRIPTION OF THE DRAWINGS

Those and other objects and features of the present invention will become apparent from the detailed description of preferred embodiments that follows by referring to the accompanying drawings, in which.

DESCRIPTION OF THE PREFERRED EMBODIMENTS

Figure 2:
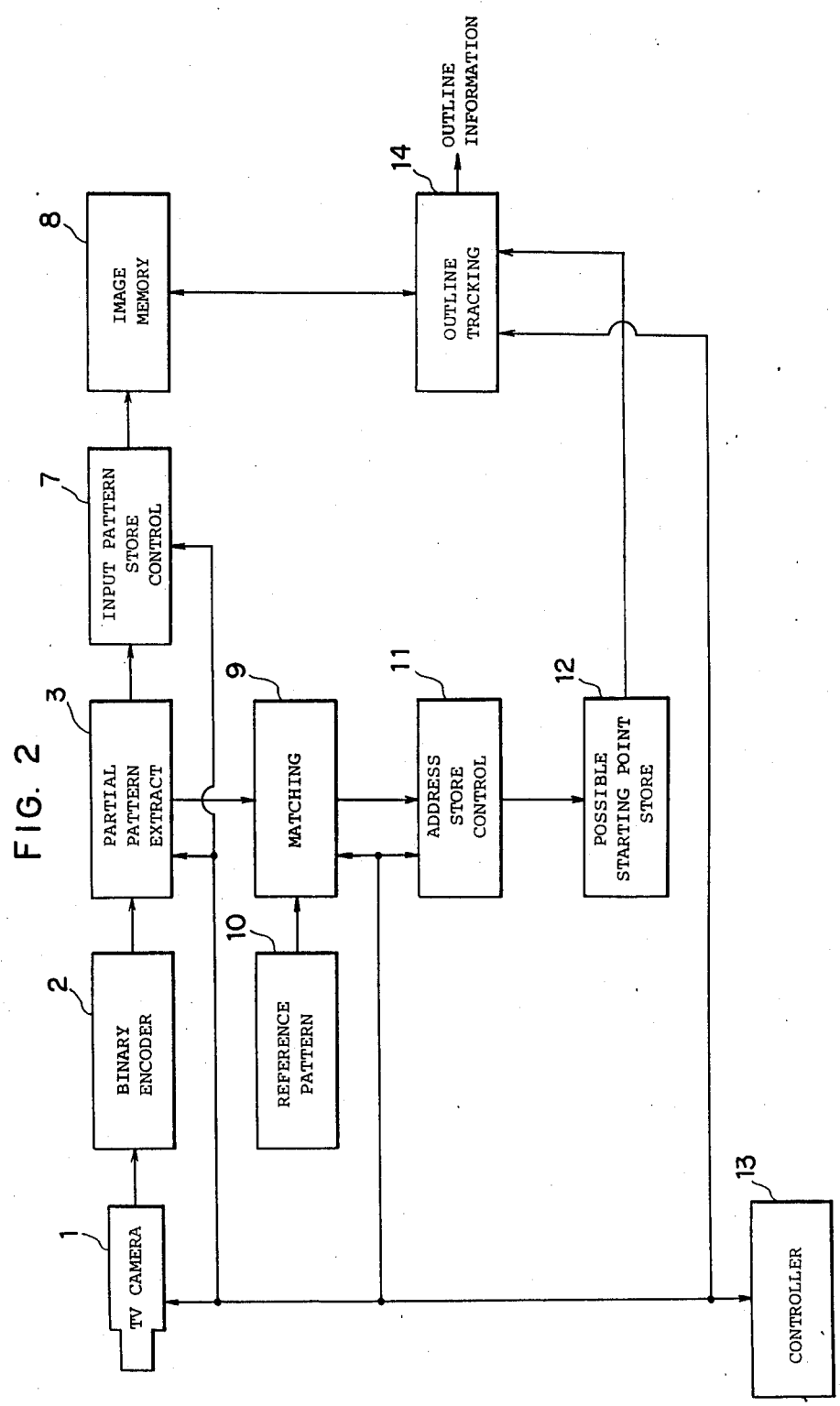
FIG. 2 is a block diagram of the pattern outline tracking apparatus in its preferred form of the present invention.

Referring to FIG. 2, the general construction of the outline tracking apparatus in it preferred form of the present invention is described. In the block diagram shown in FIG. 2, a television (TV) camera 1 optically scans an object such as characters and graphics and delivers a series of analog video signals. This camera may include a two-dimensional CCD (charge-coupled device)-based sensor, for example. A binary encoder circuit 2 accepts analog video signal output of the TV camera 1, and provides a sequence of binary signals by discriminating the input video signal components according to the previously selected threshold level. For example, the output provided by the binary encoder 2 represents an input pattern composed of white and black intensity pixels on a matrix of horizontal lines of 256 bits each and vertical lines of 256 bits each (256×256 bits). Each bit in the binary output has either the "0" state that represents the white pixel data or the "1" state that represents the black pixel data.

Figure 3:
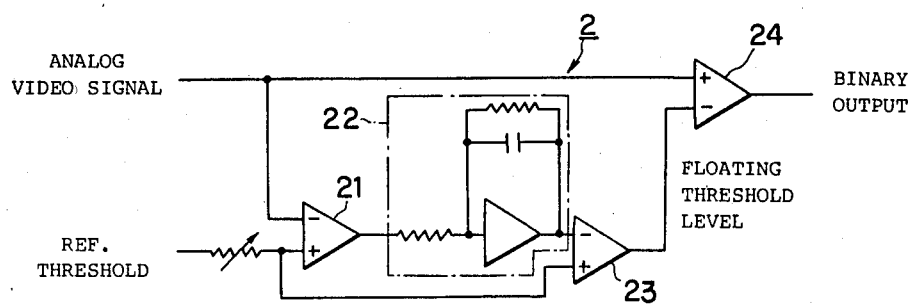
FIG. 3 shows the circuit arrangement of an example of the binary digitizer circuit.

FIG. 3 shows an example of the binary encoder circuit 2, which includes a floating-type threshold circuit. In response to the analog video signal, this floating threshold circuit provides a variable threshold level (floating thresholds) according to the intensity level of the background behind the object, which is contained in the video signal. The reason this circuit is included in the binary encoder is that the intensity of the background within the viewfield of the TV camera 1 may be affected by the illuminating light or other light sources, and may vary with the locations within the viewfield. A situation may arise where it is impossible to separate the object to be recognized such as characters and the background behind it when the binary encoder circuit can only provide a fixed threshold level. For practical purposes, therefore, the floating threshold circuit is provided to avoid such situation. The specific function of the binary encoder is to allow its floating threshold circuit to provide a threshold level that can be varied according to the intensity of the background (which represents the average level of the video signal), thereby separating the object information and the background information. Within the binary encoder circuit, a differential amplifier 21 provides a difference signal that represents a difference between certain reference threshold and video signal levels, and the difference signal is fed to an integrating circuit 22, which provides an average signal. The output of the integrating circuit 22 may have a positive or negative value, depending upon the intensity of the background information. This output is then fed to a next-stage differential amplifier 23, which subtracts the output value from the reference threshold value. Thus, a signal that represents the floating threshold level appears at its output. This output signal is applied to the input of a final-stage comparator 24, to the other input of which the video signal is applied. Through the comparator 24, the input video signal is compared with the input floating threshold level, and an output signal is thus provided, which is a sequence of serial bits which represent either the "1" or "0" state, depending upon the floating threshold level.

Figure 4:
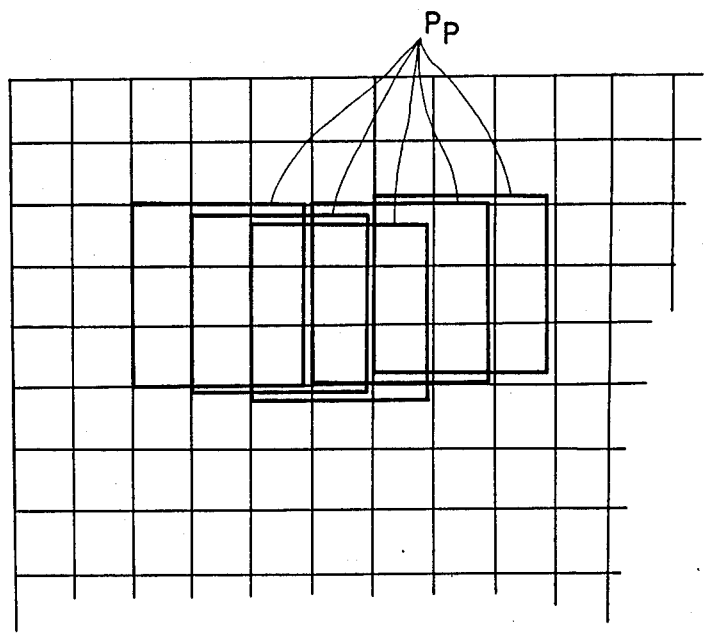
FIG. 4 is a graphical representation of partially extracted patterns on a matrix of an image.

The partial pattern extracting circuit 3 allows all possible partial patterns $P_P$ consisting 3×3 pixels to be extracted from the input image pattern consisting of 256×256 pixels, as shown in FIG. 4. This processing occurs for the serial binary-coded video signal. That is, the extraction is performed in parallel with the transfer of the video signal.

Figure 5:
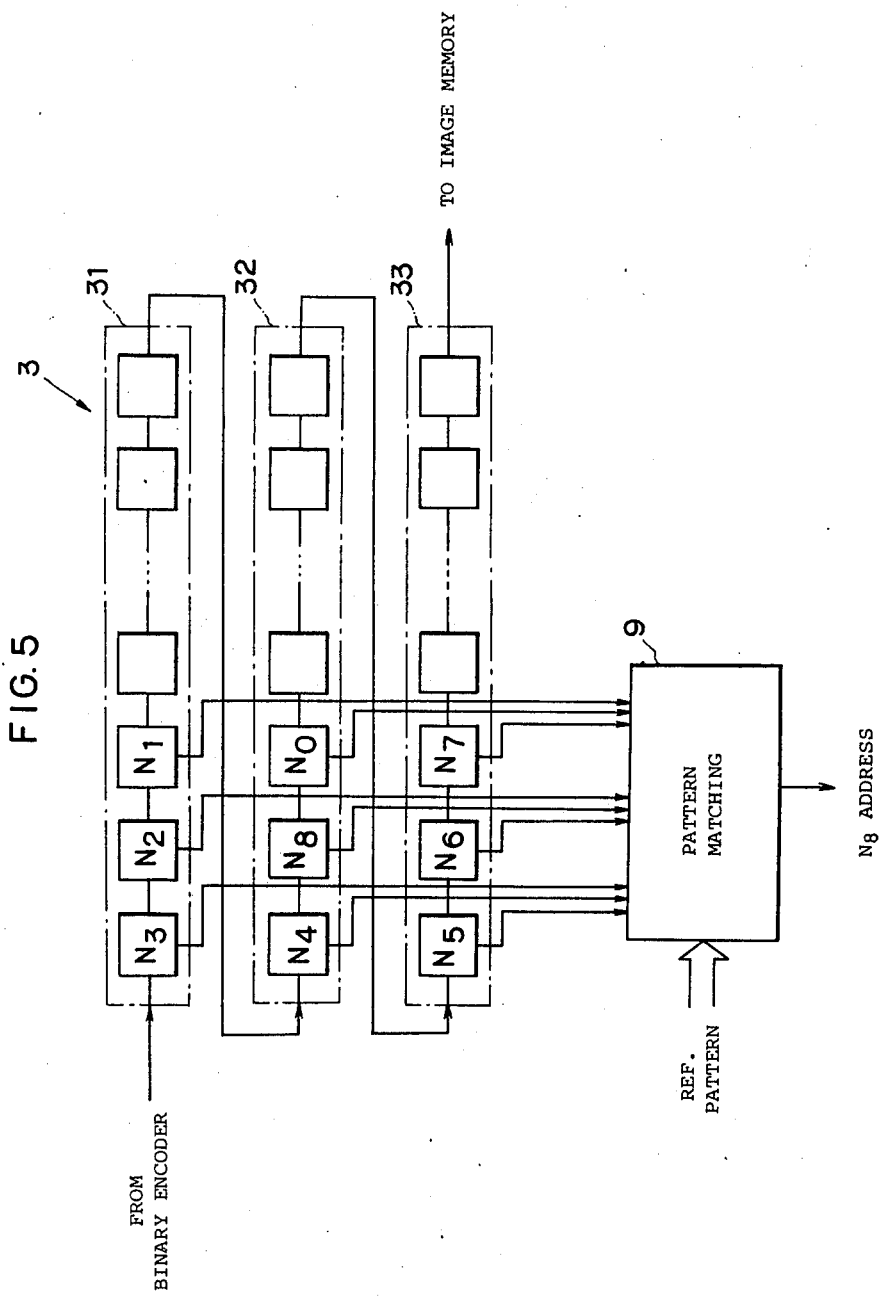
FIG. 5 is a block diagram illustrating the arrangement of a partial pattern extracting circuit.

The arrangement of this circuit 3 is shown in FIG. 5, an consists of multistage shift registers 31, 32, and 33 connected in series, each of which accepts a serial input and provides a serial output. Each of the shift registers is capable of holding the number of bits to be scanned in the main direction, that is a total of 256 bits. Each bit contained in each shift register is shifted sequentially along the chain of cells or locations each time the TV camera 1 reads one bit in its main scanning direction. That is, the read clock pulse for the TV camera 1 occurs at the same time periods as the shift pulse for the shift registers. The first three cells (as designated by $N_0$ to $N_8$) in each of the shift registers 31 to 33 temporarily hold the pixel bits in series, and then delivers those bits in parallel. Those parallel pixel data bits from the three sets of cells $N_0$ to $N_8$ are combined together, constructing the partial pattern $P_P$ as described above. The extraction of this partial pattern $P_P$ occurs each time the shift pulses for the shift registers are applied, and for each applied shift pulse, different partial patterns are obtained. The partial patterns thus obtained are then delivered to a pattern matching circuit 8. The subscripts 0 to 7 for N that represent the cell or location numbers indicate the eight orientations with the cell $N_8$ as a center.

The binary data bits that are shifted out from the third-stage shift register 33 are addressed by an input pattern store controller 7, and are sequentially written onto the corresponding locations within the image memory 8. Thus, the input image pattern is stored as two-dimensional pattern in the image memory 8.

A reference pattern setting circuit 10 provides 3×3 bit reference patterns containing the starting points to be tracked, each pattern consisting of one center pixel which indicates the starting point and eight pixels surrounding the center pixel. Those reference patterns are previously defined, based on the reference image patterns that represent the characters or graphics to be recognized.

Figures 6, 7:
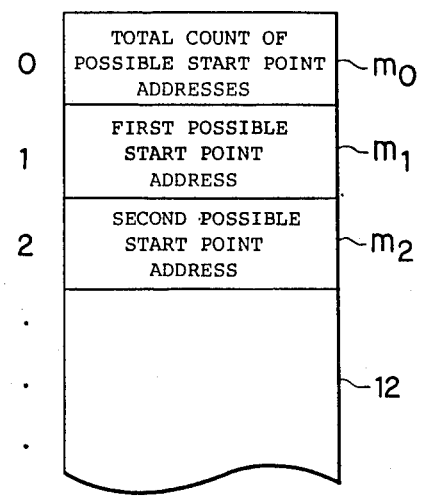
FIG. 6 illustrates an example of the reference pattern including starting point as stored as a matrix of bit pattern in the memory.
FIG. 7 shows the layout of the buffer memory in which all addressable starting points for the outline of an image to be traced are to be stored.

FIG. 6 shows an example of the reference matrix pattern containing the start point to be tracked. In the figure, the numeral "1" indicates the black intensity level pixel data, the numeral "0" indicates the white intensity level pixel data, and the letter "x" indicates that this box may contain either the black or white level pixel.

Figure 1:
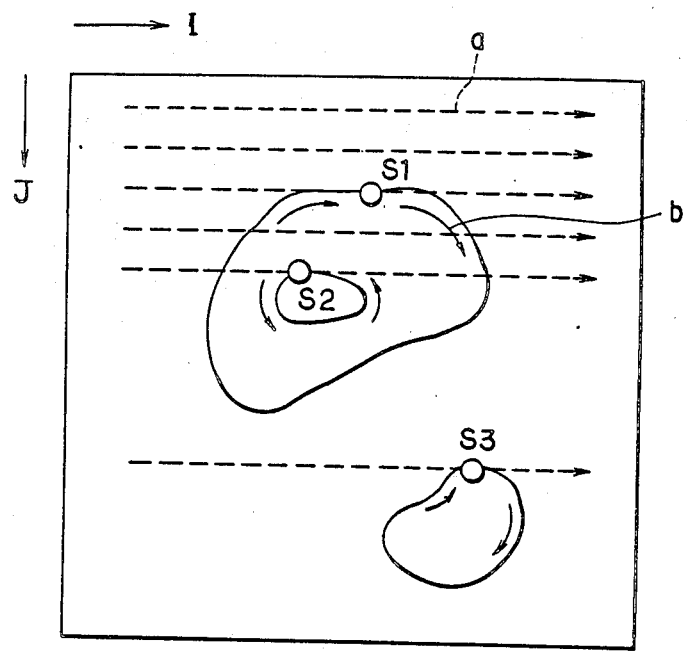
FIG. 1 is a conceptual diagram illustrating how the pattern outline tracking usually takes place by scanning through the image memory.

The patricular partial pattern provided by the circuit 3 is transferred to the pattern matching circuit 8, which compares this partial pattern against each of the reference patterns containing the starting points to be traced and previously stored in the reference pattern setting circuit 10. If any of the reference patterns is found to match that particular partial pattern, the center pixel ($N_8$) contained in the partial pattern will be considered to be an addressable (possible) point with which the outline tracking is to start. When any matching reference pattern is found, the address store controller 11 identifies the address in the image memory 8 at which the center pixel data $N_8$ for the partial pattern matching that reference pattern is to be stored, and places it in the buffer memory 12 as the addressable point (address) with which the tracking is to start. The above address (addressable point) represents the address determined by the I coordinate and J coordinate as shown in FIG. 1, and this address is placed sequentially in the data setting areas m1, m2, ... mn in the buffer memory 12 as shown in FIG. 7, each time the matching reference pattern is found by the pattern matching circuit 8. In FIG. 7, the area m0 contains the count of the number of the addressable tracking start points, and its content is cleared by the central processor (CPU) 13 at the initialization time. That is, the area m0 serves as a counter whose content is incremented by the address store controller 11.

A pattern contours tracking section 14 is the part of the apparatus that provides the pattern contours tracking function, which is performed for the imput image pattern stored in the image memory 8, based on the above-described addressable tracking start points. Details of the processing steps are given in the flowchart as shown in FIG. 8.

Referring back to FIG. 2, the central controller 13 provides the functions that control the sequential or parallel operation of the circuit elements as described so far. Specifically, the functions include the extraction of partial patterns, the read/write of data including addresses from/to the buffer memory 12, and the execution of the programmed steps required for the pattern contours tracking and other associated operations. It should be understood that the central controller 13 may be implemented by any CPU such as microprocessor.

Figure 8:
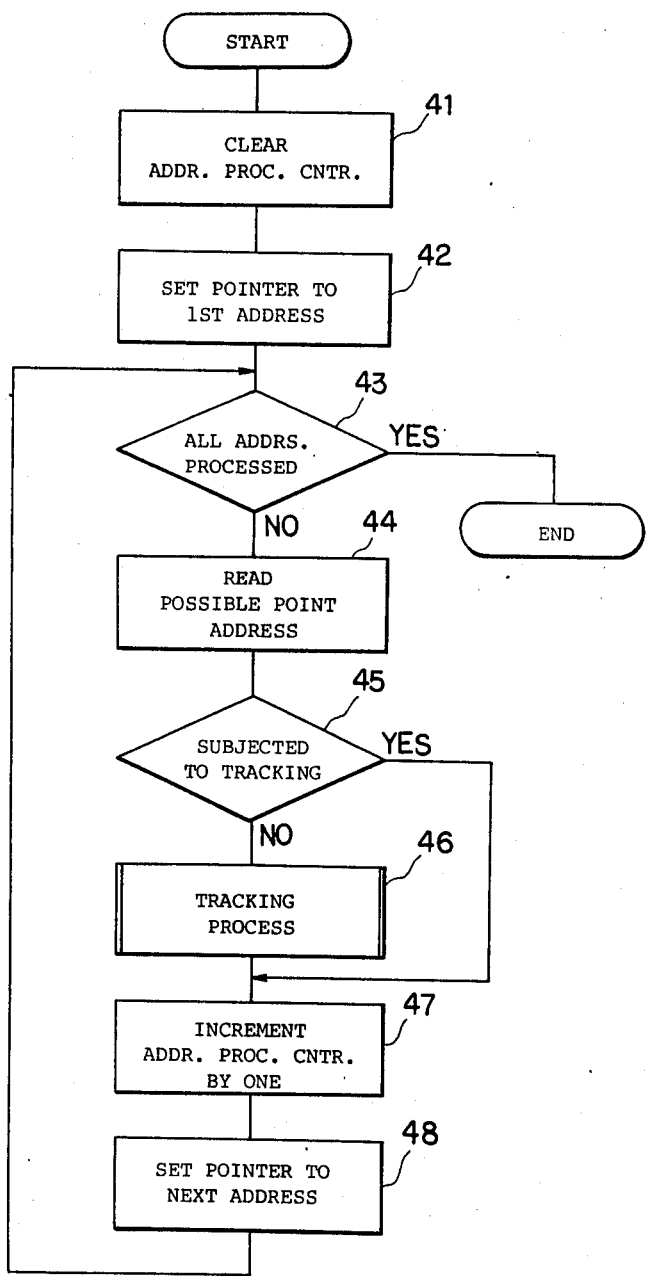
FIG. 8 is a flowchart diagram that depicts the step-by-step procedure for the pattern outline tracking.

Now, the operation is described by referring to the flowchart shown in FIG. 8. At the start of the operation, the addressable point processing counter which is located within the central controller 13 is reset to zero (cleared), and then the addressable point fetch pointer also located in the central controller 13 is set to point to the address of the first area m1 (steps 41 and 42). At the following step 43, it is checked to determine that all addressable points have been processed. This checking is made by ensuring that the content of the above addressable point processing counter matches the total number of the addressable tracking start points that has already been set in the area m0. If not (as indicated as "NO"), the step 44 is chosen, at which the address stored in the first memory area m1 as the first addressable point is retrieved from the area m1. The step 44 is followed by the step 45, at which it is checked whether the pixel stored in the image memory and which corresonds to that address has already been subjected to the tracking process. If "NO", then the step 48 is chosen, at which the tracking occurs, starting with that pixel as the first starting point.

In the embodiment shown and described as above, the image memory 8 is divided into successive storage locations, each of which is two or more bits long, one of those bits being for containing each pixel datum of a given pattern and the other being used to set the flag on or off to indicate that the pattern contours tracking is in effect or not, or for the data conversion purposes (such as changing the pixel data "1" to the data "2"). Thus, the checking that occurs at the step 45 can be made simply by interpreting the content of the particular location which corresponds to the addressable point.

During the processing at the step 48, each time the tracking occurs, the black level pixel data content for which the tracking has executed is changed, for example, from the black level pixel data "1" to the corresponding black level data "2" which indicates that tracking has been completed. When the current tracking has completed for the first one of the contours, the step 47 next to be taken is then to increment the addressable point processing counter by one (1), followed by the step 48 which sets the addressable point fetch pointer to point to the address of the second area m2 in the memory 12. This returns the controller 13 to the step 43.

During the step 44 and the following steps, the processing described for the first addressable point occurs for the second and subsequent addressable points. That is, the second and subsequent addressable point addresses are sequentially read from the buffer memory 12 (step 44), and then the checking is made to ensure that the pixel stored in the memory 8 and which corresponds to the appropriate address has already been tracked or traced (step 45). Depending upon the result of the checking, the step 46 is performed for the tracking processing (if "NO"), or is skipped over to the step 47 (if "YES"). If it is found at the step 43 that all addressable points have already been processed ("YES"), the contours tracking processing for the given pattern is concluded.

The present invention has been described by showing one particular preferred embodiment thereof. Although it has been described that the duplicate tracking for the outer boundaries or contours of a particular object such as characters and graphics may be avoided by changing the state of the pixel data which is stored in the image memory 8 and has already been processed, for example, from "1" to "2", it should be understood that the present invention is not limited to this particular embodiment. This situation may also be avoided by an alternative solution. For example, each time an address in the image memory 8 has been tracked, the address may be checked against the corresponding address entry in the buffer memory 12, and if the matching address entry is found, the entry may be treated as "invalid".

What is claimed is:

1. A pattern outline tracking apparatus comprising:
   a pickup device for scanning an object to be recognized and providing a series of analog video signals;
   a binary signal encoder for comparing a level of said analog video signal with a threshold level and providing a binary signal consisting of a sequence of serial bits;
   image memory means for holding the binary signal bits as an input image pattern;
   partial pattern extracting means interposed between said binary signal encoder and said image memory means for deriving partial patterns sequentially from the binary signal while the binary signal is transferred from said binary encoder to said image memory means, each of said partial patterns consisting of a matrix of vertical and horizontal lines each containing specific numbers of pixels;
   comparator means for matching the partial patterns against corresponding reference patterns containing previously defined starting points to be tracked;
   storage means for holding an address in said image memory for a certain pixel within a partial pattern identified by said comparator means as a possible point address for the tracking operation; and
   means for tracking an outline of said input image pattern on said image memory in accordance with said possible point address.

2. The pattern outline tracking apparatus as defined in claim 1, wherein said binary signal encoder includes a floating reference point threshold circuit.

3. The pattern outline tracking apparatus as defined in claim 1, wherein said partial pattern extracting means includes multistage shift registers connected in series, each of said shift registers having a plurality of parallel output terminals for extracting the partial pattern and containing a series of cells for each shift register providing through the parallel output terminals parallel pixel data bits which are all combined together to construct a partial pattern.

4. A pattern outline tracking method comprising the steps of:
   scanning an object to be recognized and providing a series of analog video signals:
   comparing a level of said analog video signals with a threshold level and providing a binary signal consisting of a sequence of serial bits:
   holding the binary signal bits as an input image pattern in an image memory:

extracting partial patterns sequentially from the binary signal while the binary signal is transferred to said image memory, each of said partial patterns consisting of a matrix of vertical and horizontal lines each containing specific numbers of pixels;

matching the partial patterns against corresponding reference patterns containing previously defined starting points to be tracked;

holding an address in said image memory for a certain pixel within the partial pattern identified in said matching step as a possible point address for a tracking operation; and tracking an outline of said input image pattern on said image memory in accordance with said possible point address.

5. The pattern outline and tracking method defined in claim 4, wherein said threshold level is varied in accordance with an average background level of said video signals.

6. The pattern outline tracking apparatus as defined in claim 2, further comprising means for varying said threshold level in accordance with an average background level of said video signals.

* * * * *